(12) United States Patent
Miller et al.

(10) Patent No.: US 8,240,696 B1
(45) Date of Patent: Aug. 14, 2012

(54) HITCH PIN ASSEMBLY

(75) Inventors: Logan C. Miller, Clifford, ND (US);
Mark Allan Renard, Page, ND (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/050,489

(22) Filed: Mar. 17, 2011

(51) Int. Cl.
*B60D 1/02* (2006.01)

(52) U.S. Cl. ........................................................ 280/515

(58) Field of Classification Search .................. 280/515, 280/504, 507, 491.5; 7/143, 146; 24/453
See application file for complete search history.

(56) References Cited

U.S. PATENT DOCUMENTS

| | | | |
|---|---|---|---|
| 277,701 A | | 5/1883 | Fowler |
| 336,736 A | | 2/1886 | O'Rourke |
| 1,461,412 A | | 7/1923 | Clement |
| 2,454,856 A | * | 11/1948 | Bible ............................ 411/341 |
| 2,545,066 A | | 3/1951 | Belke et al. |
| 2,687,900 A | * | 8/1954 | Thomas ........................ 280/515 |
| 3,200,690 A | * | 8/1965 | Dickman ...................... 411/337 |
| 3,865,407 A | * | 2/1975 | Klassen ........................ 280/515 |
| 4,023,823 A | | 5/1977 | Saunders |
| 4,298,212 A | * | 11/1981 | Jamison ........................ 280/515 |
| 4,671,528 A | * | 6/1987 | Thompson .................... 280/504 |
| 5,240,266 A | | 8/1993 | Kelley et al. |
| 5,713,698 A | | 2/1998 | Worsley |
| 5,865,559 A | * | 2/1999 | Yang ........................... 403/322.1 |
| 6,116,633 A | | 9/2000 | Pride |
| 6,193,260 B1 | * | 2/2001 | Homan et al. ................. 280/515 |
| 6,193,261 B1 | * | 2/2001 | Hahka ........................... 280/515 |
| 6,595,397 B2 | * | 7/2003 | Teich ............................ 224/410 |
| 6,604,752 B1 | * | 8/2003 | Gerres et al. ................. 280/415.1 |
| 7,306,275 B2 | * | 12/2007 | Kalous ........................... 296/1.07 |
| 7,316,534 B2 | * | 1/2008 | Hohmann et al. ............. 411/340 |
| 7,419,178 B2 | | 9/2008 | Inoue |
| 7,712,764 B2 | * | 5/2010 | Maillet ........................ 280/515 |

FOREIGN PATENT DOCUMENTS

| | | |
|---|---|---|
| DE | 003716331 A1 | 11/1988 |
| DE | 003810360 A1 | 10/1989 |
| JP | 406127227 A | 5/1994 |
| JP | 406316209 A | 11/1994 |

* cited by examiner

*Primary Examiner* — Tashiana Adams
(74) *Attorney, Agent, or Firm* — Patrick M. Sheldrake

(57) ABSTRACT

A hitch pin assembly includes a first pin having a longitudinal axis, a first end and a second end. A second pin extends from the longitudinal axis in close proximity to the first end. A third pin extends from the longitudinal axis in close proximity to the first end. A fourth pin extends from the longitudinal axis in close proximity to the second end. The first pin is configured to be received between a hitched position and an unhitched position in a member having an upper portion, a lower portion, and a hitch area positioned between the upper portion and the lower portion. Upon installation of the second pin and the fourth pin to the first pin, travel of the first pin along the longitudinal axis is restricted in each of opposed directions so that the hitch pin assembly cannot be removed from the member.

20 Claims, 5 Drawing Sheets

HITCH PIN ASSEMBLY

FIELD OF THE INVENTION

The present invention relates generally to the field of work vehicles. It relates more particularly to towing apparatus for work vehicles.

BACKGROUND OF THE INVENTION

Work vehicles, such as wheel loaders, include an implement with which to perform work during operation of the work vehicle. The implement is typically located at one end of the work vehicle. Large covers or hoods are typically used to enclose the motor of the work vehicle, and are positioned at the opposite end of the work vehicle. A counterweight may be positioned near the end of the work vehicle adjacent the motor, which counterweight may be configured to receive a towing apparatus, such as a hitch pin assembly.

It would be desirable to limit the overall length of the work vehicle. However, reducing the length of the work vehicle to the extent the hood overlies a portion of the hitch pin assembly would prevent removal of a conventional hitch pin assembly with the hood in its normally retracted position (i.e., pulling the hitch pin assembly vertically upward from the counterweight). Additionally, such a work vehicle arrangement would prevent current hitch pin assembly manipulation between a hitched position and an unhitched position without risk of damaging the hood and/or inadvertently losing the hitch pin assembly during operation.

Accordingly, it would be advantageous to provide a hitch pin assembly compatible with an overlying hood that would also permit manipulation of the hitch pin assembly between a hitched position and an unhitched position without raising the hood, and without risk of damaging the hood and/or inadvertently losing the hitch pin assembly during operation of the work vehicle.

SUMMARY OF THE INVENTION

The present invention further relates to a hitch pin assembly including a first pin having a longitudinal axis, a first end and a second end. A second pin extends substantially perpendicular to the longitudinal axis in close proximity to the first end. A third pin extends substantially perpendicular to the longitudinal axis in close proximity to the first end. A fourth pin extends substantially perpendicular to the longitudinal axis in close proximity to the second end. The first pin is configured to be received between a hitched position and an unhitched position in a member having an upper portion, a lower portion, and a hitch area positioned between the upper portion and the lower portion. In the hitched position, the first pin extends at least substantially through the upper portion, through the hitch area, and at least partially into the lower portion. In the unhitched position, the first pin extends only at least substantially through the lower portion. Upon installation of the second pin and the fourth pin to the first pin of the hitch pin assembly in the member, travel of the first pin along the longitudinal axis is restricted in each of opposed directions so that the hitch pin assembly cannot be removed from the member.

The present invention further relates to a work vehicle including a motor associated with selectable movement of a frame by operator controls. The frame structurally carries a cab structure and a member adjacent one end of the frame for selectable towing by a hitch pin assembly. The hitch pin assembly includes a first pin having a longitudinal axis, a first end and a second end and a second pin extending substantially perpendicular to the longitudinal axis in close proximity to the first end. A third pin extends substantially perpendicular to the longitudinal axis in close proximity to the first end. A fourth pin extends substantially perpendicular to the longitudinal axis in close proximity to the second end. The first pin is configured to be received between a hitched position and an unhitched position in a member having an upper portion, a lower portion, and a hitch area positioned between the upper portion and the lower portion. In the hitched position, the first pin extends at least substantially through the upper portion, through the hitch area, and at least partially into the lower portion. In the unhitched position, the first pin extends only at least substantially through the lower portion. Upon installation of the second pin and the fourth pin to the first pin of the hitch pin assembly in the member, travel of the first pin along the longitudinal axis is restricted in each of opposed directions so that the hitch pin assembly cannot be removed from the member.

An advantage of the present invention is a hitch pin assembly that is selectably movable between a hitched position and an unhitched position while an overlying motor hood remains in a retracted position, the hitch pin assembly prevented from removal from its receiving member.

A further advantage of the present invention is a hitch pin assembly that has limited travel along its longitudinal axis in opposed directions.

It is to be understood that one or more of the above-referenced advantages may be contained in an exemplary embodiment of the present invention.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
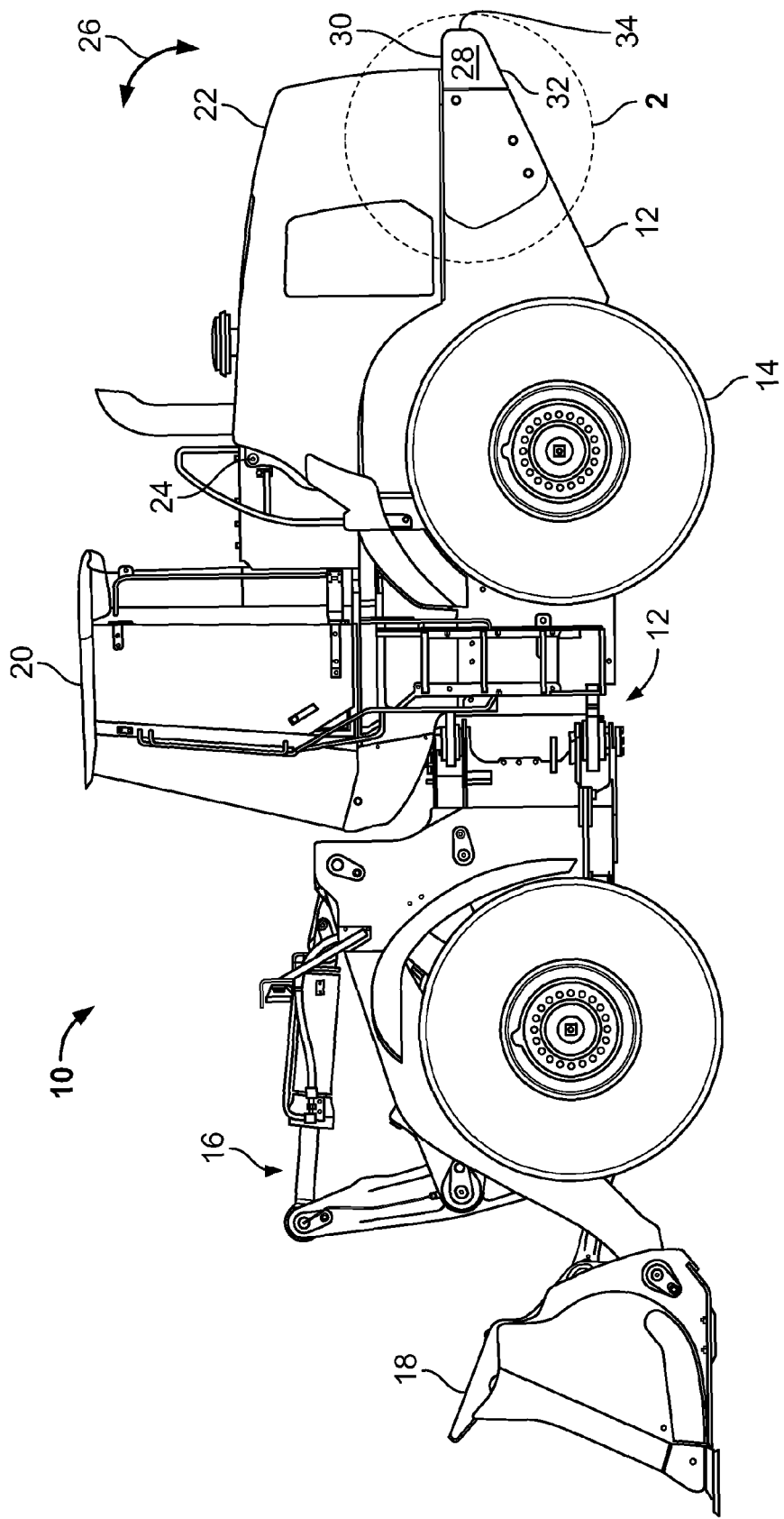
FIG. 1 is an elevation view of an embodiment of a work vehicle.

FIG. 1 shows a work vehicle 10 provided with a frame 12 that rotatably carries a plurality of wheels 14. Alternately, a track drive or other appropriate drive system to movably drive the frame may be used. A manipulating structure 16 includes an arrangement of structural members and actuators controllable by an operator (not shown) located within a cab structure 20 to manipulate an implement 18 to perform work. Frame 12 structurally supports cab structure 20 to surround and protect the operator. Located opposite implement 18 is a motor (not shown) that is surrounded by a housing or hood 22 that surrounds the motor when the hood is in a retracted position. Due to the enlarged hood's size and weight, in one embodiment, a hood opening device (not shown) may be operated by an electric motor. However, in other embodiments, springs or other types of devices, such as hydraulic, mechanical, pneumatic or combination may be used. In combination with a pair of opposed pivots 24 and the hood opening device, hood 22 is urged into a rotational movement 26. As further shown in FIG. 1, hood 22 is in a retracted position, resting on frame 12 which extends to a member such as a counterweight 28 having a first or upper surface 30, a second or lower surface 32 and a third or aft surface 34.

Figure 2:
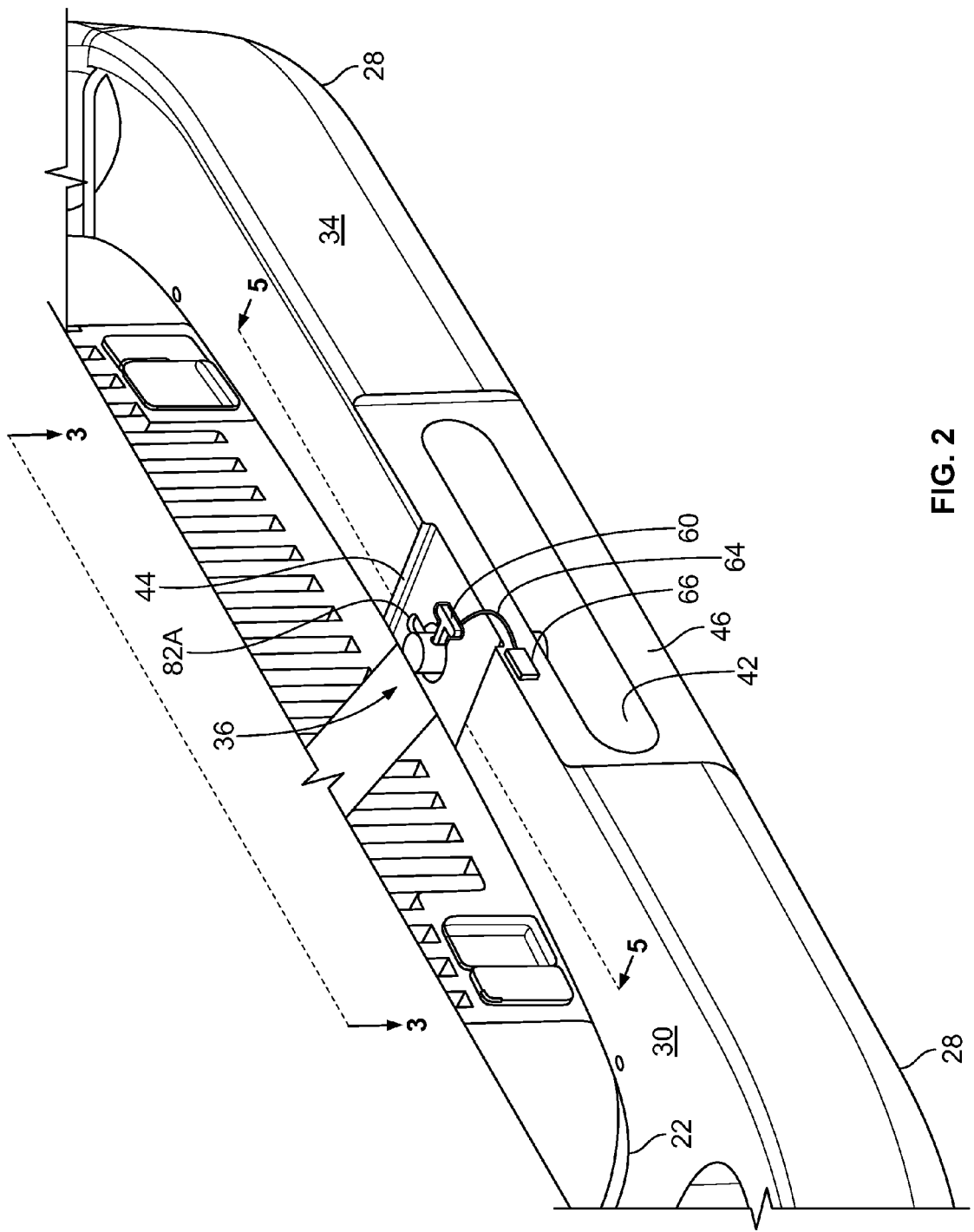
FIG. 2 is a top perspective view of an embodiment of the work vehicle taken along region 2 from FIG. 1.
Figure 3:
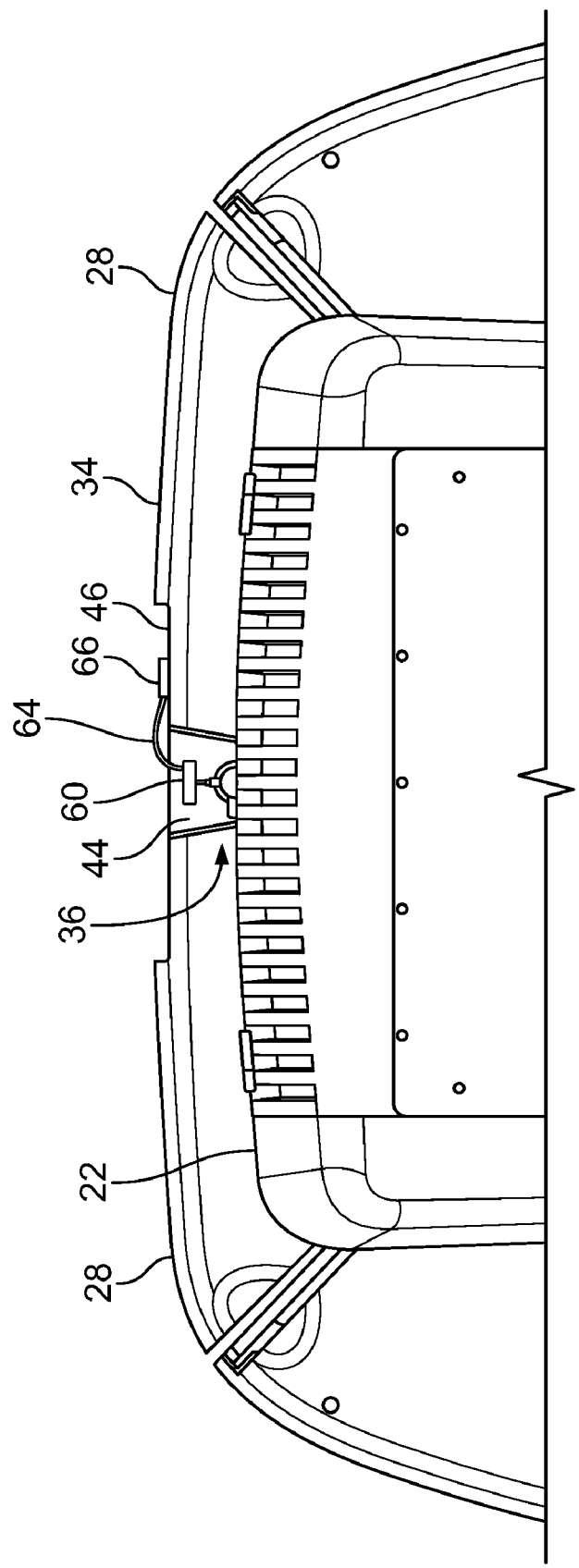
FIG. 3 is a plane view of an embodiment of the work vehicle taken along line 3-3 taken from FIG. 2.
Figure 4:
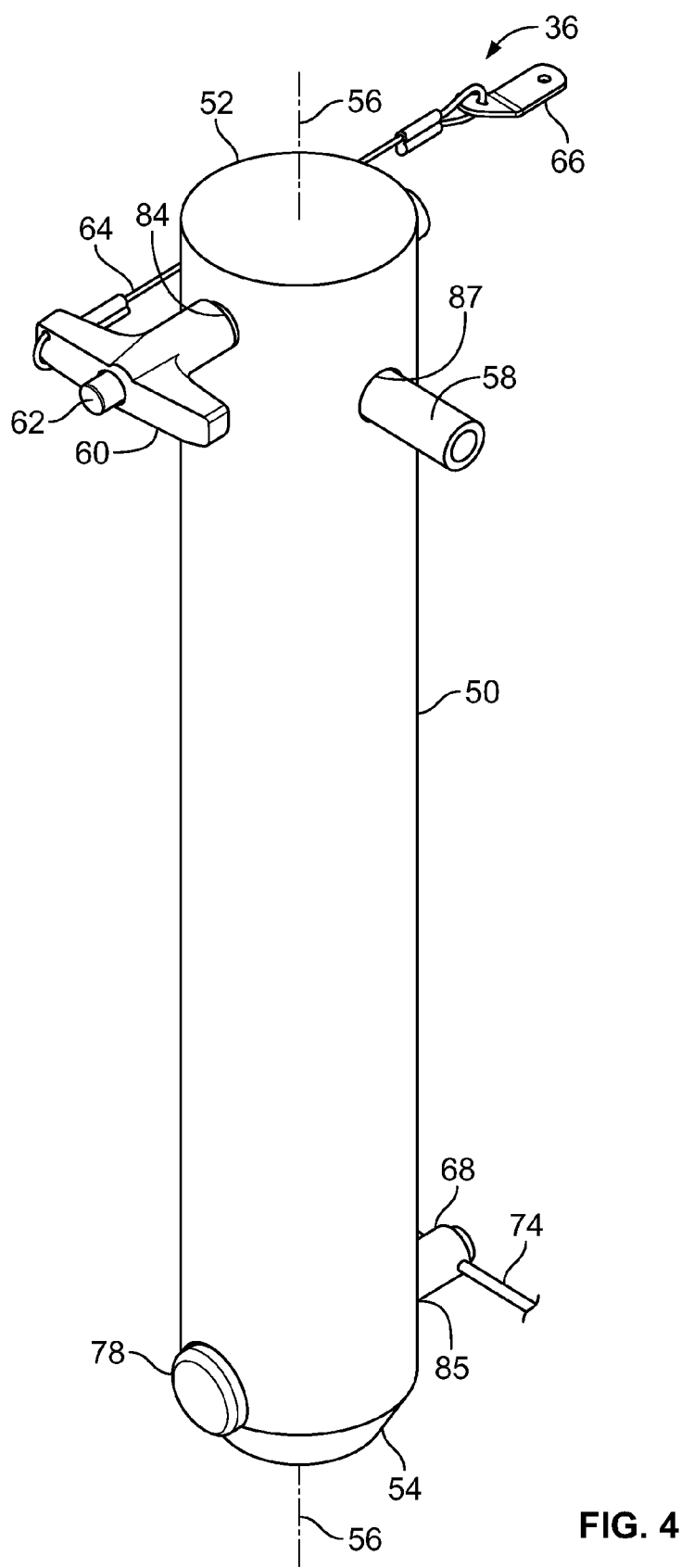
FIG. 4 is a top perspective view of an exemplary embodiment of an assembled hitch pin assembly as configured for a hitched position (shown without receiving member into which hitch pin assembly is installed).

As further shown FIGS. 2-4, member or counterweight 28 is configured to receive a hitch pin assembly 36 that permits work vehicle 10 to provide a towing function. Member or counterweight 28 includes a hitch area 42 positioned between an upper portion 38 and a lower portion 40. Hitch area 36 defines a hitched position 70 (FIG. 5) and an unhitched position 72 (FIG. 6), depending upon the position of hitch pin assembly 36 with respect to the hitch area, which positions will be discussed in further detail. However, irrespective of whether the of hitch pin assembly 36 is positioned in a hitched position or an unhitched position, the hitch pin assembly is secured substantially beneath the first or upper surface 30 of the member or counterweight in order to prevent the hitch pin assembly from damaging hood 22. In another embodiment, the hitch pin assembly is secured flush or beneath the first or upper surface 30 of the member or counterweight. Similarly, hitch pin assembly 36 is substantially secured above the second or lower surface 32 of the member or counterweight in order to prevent damage to the hitch pin assembly during operation of work vehicle 10. In another embodiment, the hitch pin assembly 36 is secured flush or above the second or lower surface 32 of the member or counterweight.

As further shown FIGS. 2-4, member or counterweight 28 includes a first recess 44 formed in the first or upper surface 30. A second recess 46 is formed in the third or aft surface 34 of member or counterweight 28. As will be described in further detail below, first recess 44 is utilized to help secure hitch pin assembly 36 substantially beneath the first or upper surface 30 of the member or counterweight 28.

As shown in FIG. 4, hitch pin assembly 36 includes a first pin 50 having a first end 52, a second end 54 and a longitudinal axis 56 extending through the first and second ends. A second pin 58, such as a spring pin, extends outwardly from an aperture 86 in a direction substantially perpendicular to longitudinal axis 56 of first pin 50 in close proximity to first end 52. As further shown in FIG. 4, second pin 58 extends from only one side of first pin 50, although in another embodiment, second pin 58 may extend through opposed sides of first pin 50. A third pin 60, when installed, extends through an aperture 84 of first pin 50 in a direction substantially perpendicular to longitudinal axis 56 of the first pin. As shown, third pin 60 is a quick release pin, including a button 62 controlling the position of retention balls associated with the pin, also sometimes referred to as a ball lock pin. When not installed in first pin 50, third pin 60 includes a tether or lanyard 64 that is secured at one end of the lanyard to the head of third pin 60 into a tab 66 at the opposite end of the lanyard. Tab 66 is then secured to structure, such as member or counterweight 28, as shown in FIG. 2. In one embodiment, tab 66 is secured to a second recess 46 such that third pin 60 and lanyard 64 are substantially below each of the first or upper surface 30, as well as the third or aft surface 34 of member or counterweight 28. A fourth pin 68, when installed, extends through an aperture 85 formed in first pin 50 in a direction that is substantially perpendicular to the first pin. A head 78 of fourth pin 68 is larger than aperture 85 of first pin 50. As further shown FIG. 4, fourth pin 68 is a clevis pin, including a cotter pin 76 that extends through the fourth pin to secure the fourth pin in an installed position in first pin 50. It is to be understood that other pin constructions may be utilized for each of the pins described above.

Figure 5:
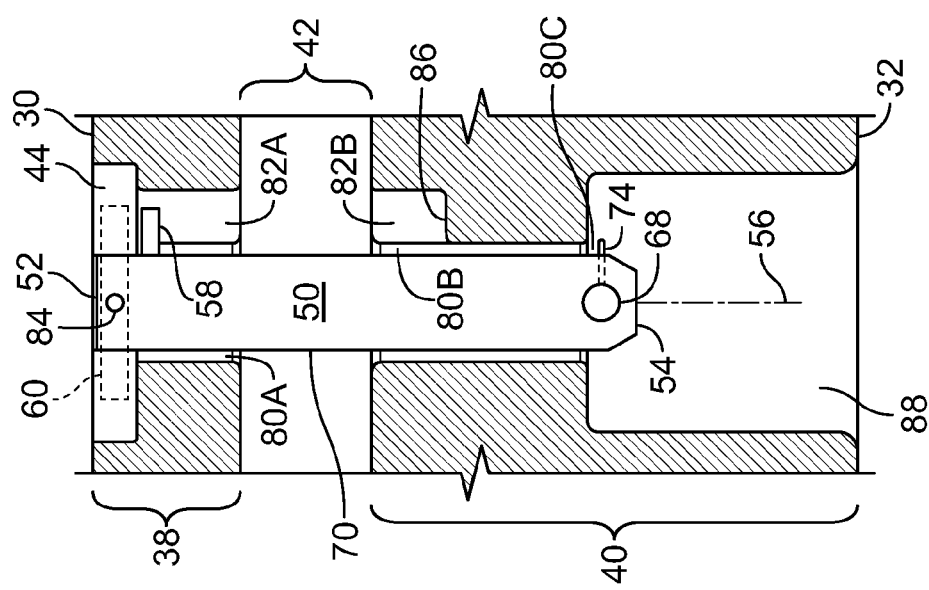
FIG. 5 is a cross section taken along line 5-5 of FIG. 2, with the hitch pin assembly shown in a hitched position.

Referring to FIGS. 2-6, the operation of the hitch pin assembly of the present disclosure is now described. FIG. 5 shows first pin 50 of hitch pin assembly 36 (FIG. 4) in a hitched position 70. A hitched position is understood to represent a position of the hitch pin assembly with respect to member or counterweight 28 that permits towing operations of the work vehicle. As further shown in FIG. 5, first pin 50 extends through hitch area 42 and is secured in each of an upper portion 38 and lower portion 40 of member or counterweight 28. Conversely, an unhitched position is understood to represent the position of the hitch pin assembly with respect to member or counterweight 28 that does not permit towing operations of the work vehicle, as will be explained in further detail with respect to FIG. 6.

In one embodiment, as shown in FIG. 5, first pin 50 may be installed in member or counterweight 28 upon removal of fourth pin 68 and then directing second end 54 of first pin 50 through opening 80A formed in upper portion 38. A slot 82A is also formed in upper portion 38 and extends from opening 80A (FIG. 2). Slot 82A is configured to receive second pin 58 therethrough. That is, third pin 60 must be installed in first pin 50 to prevent first pin 50, as well as second pin 58, from falling through slotted opening 80A formed in upper portion 38 of member or counterweight 28. Stated another way, when third pin 60 is installed in first pin 50, first end 52 of first pin 50 is secured in upper position 38 and substantially beneath first or upper surface 30 of upper portion 38 of member or counterweight 28. In another embodiment, when third pin 60 is installed in first pin 50, first end 52 of first pin 50 is secured in upper portion 38 and flush or beneath first or upper surface 30 of upper portion 38 of member or counterweight 28. By virtue of first end 52 being secured at least substantially beneath first or upper surface 30 (or flush or beneath first or upper surface 30) in first recess 44 of member or counterweight 28, first pin 50 will not cause or result in damage to the hood of the work vehicle.

It is to be understood that first or upper surface 30, second or lower surface 32 and third or aft surface 34 are not limited to planar surfaces.

As further shown in FIG. 5, second end 54 of first pin 50 extends through hitch area 42 and at least a portion of lower portion 40 of member or counterweight 28. Upon second end 54 protruding through opening 80B and extending inside of an opening 80C that defines a portion of a recess 88 formed in member or counterweight 28, fourth pin 68 may be installed. Once fourth pin 68 is installed, second end of first pin 50 is substantially prevented from traveling vertically upward along longitudinal axis 56 past opening 80C, and the first end of pin 50 is also substantially prevented from traveling vertically downward through slotted opening 80B by third pin 60. In other words, travel of first pin 50 along longitudinal axis 56 is restricted in each of opposed directions so that the hitch pin assembly cannot be removed from member or counterweight 28, irrespective of whether the hitch pin assembly remains in hitched position 70 or is urged to move toward unhitched position 72.

Figure 6:
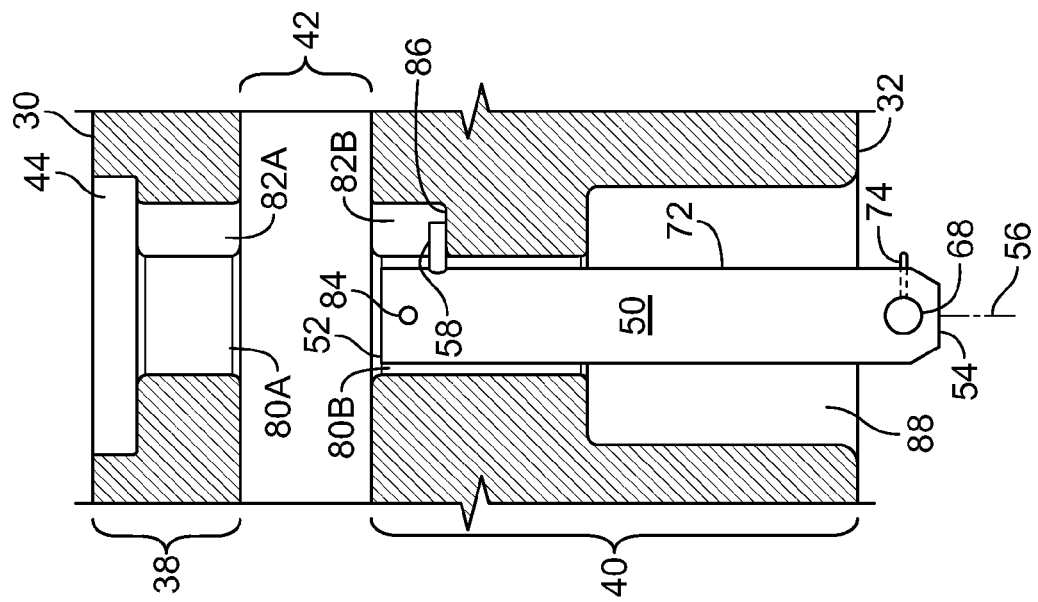
FIG. 6 is a cross section taken along line 5-5 of FIG. 2, with the hitch pin assembly shown in an unhitched position.

As further shown in FIG. 6, upon removal of third pin 60 from first pin 50, first end 52 and second pin 58 of the first pin 50 may then travel through slotted opening 80A formed in upper portion 38 as well as through hitch area 42. First end of first pin 50 52 and second pin 58 then begin traveling through a slotted opening 80B formed in lower portion 40, which slotted opening 80B including an outwardly extending slot 82B configured to receive the second pin. Further travel of first pin 50 in a downward direction through lower portion 40 is halted when second pin 58 is brought into abutting contact with terminus 86 of slot 82B. In this position, first end 52 of the first pin 50 is secured substantially beneath the hitch area, permitting a tow line, towbar or other towing apparatus to be inserted in the hitch area in preparation of towing (or removed to prevent towing), once the first pin of the hitch pin assembly has been returned to its hitched position (FIG. 5).

To summarize, in either of FIG. 5 (showing hitched position of first pin 50) and FIG. 6 (showing unhitched position of first pin 50), travel along the longitudinal axis 56 of the first pin 50 and the second pin 58 is restricted so that the hitch pin assembly 36 cannot be removed from the member or counterweight 28. In FIG. 5, third pin 60 substantially prevents downward movement of the first pin 50 through the upper portion 38 of the member or counterweight 28, and fourth pin 68 substantially prevents upward movement of the first pin 50 through the lower portion 40 of the member or counterweight 28. In FIG. 6, second pin 58 substantially prevents downward movement of the first pin 58 through the lower portion 40 of the member or counterweight 28, and fourth pin 68 prevents upward movement of the first pin 50 through opening 80B of the lower portion 40 of the member or counterweight 28.

Although second end 54 of first pin 50 is shown in FIG. 6 as protruding through or beneath of second or lower surface 32 of lower portion 40 of member or counterweight 28, in another embodiment, second end 54 a first pin 50 may be prevented from protruding through or beneath of second or lower surface 32 of lower portion 40 of member or counterweight 28. In this construction, the hitch pin assembly would be prevented from extending past the protective second or lower surface 32 of member or counterweight 28, which would help protect the hitch pin assembly during operation of the work vehicle.

As shown in FIGS. 5 and 6, slots 82A and 82B are aligned, resulting in an angular orientation of the first pin that does not change between the hitched position and the unhitched position. However, in another embodiment, the slots may be positioned in a different alignment, which would require the first pin to rotate about its longitudinal axis between the hitched and unhitched positions.

It is to be understood that directional references, such as up or down, are provided to more easily understand the disclosure and not intended to be limiting.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle comprising: a receiving member adjacent an end of a frame of the vehicle for receiving a hitch pin assembly; the hitch pin assembly comprising: a first pin having a longitudinal axis, a first end and a second end; a second pin extending substantially perpendicular to the longitudinal axis in close proximity to the first end; a removable third pin; a fourth pin extending substantially perpendicular to the longitudinal axis in close proximity to the second end; the first pin configured to be received between a hitched position and an unhitched position in the receiving member, the receiving member having an upper portion, a lower portion, and a void forming a hitch area positioned between the upper portion and the lower portion; wherein in the hitched position, the first pin extends at least substantially through the upper portion, through the hitch area, and at least partially into the lower portion; and the third pin is installed extending substantially perpendicular to the longitudinal axis engaging with the receiving member for maintaining the first pin in the hitched position; wherein in the unhitched position, the first pin is substantially maintained within the lower portion; wherein upon installation of the second pin and the fourth pin to the first pin of the hitch pin assembly in the member, travel of the first pin along the longitudinal axis is restricted in each of opposed directions so that the hitch pin assembly cannot be removed from the member.

2. The hitch pin assembly of claim 1, wherein an angular orientation with respect to the longitudinal axis of the first pin does not change between the hitched position and the unhitched position.

3. The hitch pin assembly of claim 1, wherein in the hitched position, the first end of the first pin is secured substantially beneath a first surface of the upper portion of the member.

4. The hitch pin assembly of claim 1, wherein in the unhitched position, the second end of the first pin is secured substantially above a second surface of the lower portion of the member.

5. The hitch pin assembly of claim 1, wherein openings formed in the upper portion and the lower portion of the member include a slot to receive the second pin.

6. The hitch pin assembly of claim 1, wherein upon installation of the third pin in the first pin, the third pin supports the first pin in the hitched position.

7. The hitch pin assembly of claim 6, upon removal of the third pin from the first pin, the second pin supports the first pin in the unhitched position.

8. The hitch pin assembly of claim 1, wherein the fourth pin limits movement of the first pin in the longitudinal direction, preventing removal of the first pin from the lower portion of the member.

9. The hitch pin assembly of claim 1, wherein the second pin is a spring pin.

10. The hitch pin assembly of claim 1, wherein third pin is a tethered quick release pin.

11. A hitch pin assembly comprising:
a first pin having a longitudinal axis, a first end and a second end;
a second pin extending substantially perpendicular to the longitudinal axis in close proximity to the first end;
a third pin extending substantially perpendicular to the longitudinal axis in close proximity to the first end;
a fourth pin extending substantially perpendicular to the longitudinal axis in close proximity to the second end;
the first pin configured to be received between a hitched position and an unhitched position in a member having an upper portion, a lower portion, and a hitch area positioned between the upper portion and the lower portion;
wherein in the hitched position, the first pin extends at least substantially through the upper portion, through the hitch area, and at least partially into the lower portion;
wherein in the unhitched position, the first pin extends through the lower portion;
wherein upon installation of the second pin and the fourth pin to the first pin of the hitch pin assembly in the member, travel of the first pin along the longitudinal axis is restricted in each of opposed directions so that the hitch pin assembly cannot be removed from the member; and wherein an opening formed in the member to receive the first pin is at least partially located beneath a hood of a work vehicle.

12. A work vehicle comprising:

a motor associated with selectable movement of a frame by operator controls;

the frame structurally carrying a cab structure and a member adjacent one end of the frame for selectable towing by a hitch pin assembly comprising:

- a first pin having a longitudinal axis, a first end and a second end;
- a second pin extending substantially perpendicular to the longitudinal axis in close proximity to the first end;
- a third pin extending substantially perpendicular to the longitudinal axis in close proximity to the first end;
- a fourth pin extending substantially perpendicular to the longitudinal axis in close proximity to the second end;
- the first pin configured to be received between a hitched position and an unhitched position in a member having an upper portion, a lower portion, and a hitch area positioned between the upper portion and the lower portion;
- wherein in the hitched position, the first pin extends at least substantially through the upper portion, through the hitch area, and at least partially into the lower portion;
- wherein in the unhitched position, the first pin extends through the lower portion;
- wherein upon installation of the second pin and the fourth pin to the first pin of the hitch pin assembly in the member, travel of the first pin along the longitudinal axis is restricted in each of opposed directions so that the hitch pin assembly cannot be removed from the member.

13. The work vehicle of claim 12, wherein an angular orientation with respect to the longitudinal axis of the first pin does not change between the hitched position and the unhitched position.

14. The work vehicle of claim 12, wherein in the hitched position, the first end of the first pin is secured substantially beneath a first surface of the upper portion of the member.

15. The work vehicle of claim 12, wherein in the unhitched position, the second end of the first pin is secured substantially above a second surface of the lower portion of the member.

16. The work vehicle of claim 12, wherein openings formed in the upper portion and the lower portion of the member include a slot to receive the second.

17. The work vehicle of claim 12, wherein upon installation of the third pin in the first pin, the third pin supports the first pin in the hitched position.

18. The work vehicle of claim 17, upon removal of the third pin from the first pin, the second pin supports the first pin in the unhitched position.

19. The work vehicle of claim 12, wherein the fourth pin limits movement of the first pin in the longitudinal direction, preventing removal of the first pin from the lower portion of the member.

20. The work vehicle of claim 12, wherein an opening formed in the member to receive the first pin is at least partially located beneath a hood of the work vehicle.

* * * * *